United States Patent
Park et al.

(10) Patent No.: US 11,416,974 B2
(45) Date of Patent: Aug. 16, 2022

(54) IMAGE PROCESSING METHOD AND ELECTRONIC DEVICE SUPPORTING THE SAME

(71) Applicant: Samsung Electronics Co., Ltd., Gyeonggi-do (KR)

(72) Inventors: Chansik Park, Gyeonggi-do (KR); Chanyul Park, Gyeonggi-do (KR); Yongchul Kim, Gyeonggi-do (KR); Jeehong Kim, Gyeonggi-do (KR); Hyungsuk Kim, Gyeonggi-do (KR); Wonjun Roh, Gyeonggi-do (KR); Jungik Seo, Gyeonggi-do (KR); Hyuntaek Lee, Gyeonggi-do (KR); Jaehun Cho, Gyeonggi-do (KR); Donghyun Yeom, Gyeonggi-do (KR); Jungeun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 17/036,196

(22) Filed: Sep. 29, 2020

(65) Prior Publication Data
US 2021/0097655 A1 Apr. 1, 2021

(30) Foreign Application Priority Data
Sep. 30, 2019 (KR) .................. KR10-2019-0120870

(51) Int. Cl.
*H04N 5/228* (2006.01)
*G06T 5/00* (2006.01)
(Continued)

(52) U.S. Cl.
CPC ................ *G06T 5/009* (2013.01); *G06T 5/50* (2013.01); *H04N 5/23216* (2013.01);
(Continued)

(58) Field of Classification Search
CPC ........... H04N 5/23216; H04N 5/23229; H04N 5/232939; G06T 5/009; G06T 5/50; G06T 2207/20004; G06T 2207/20208
See application file for complete search history.

(56) References Cited

U.S. PATENT DOCUMENTS 9,978,130 B2 5/2018 Sun
2007/0081721 A1 4/2007 Xiao et al.
(Continued)

FOREIGN PATENT DOCUMENTS

EP 3249606 A1 11/2017
JP 2001-298631 A 10/2001
KR 10-2014-0066771 A 6/2014

OTHER PUBLICATIONS

International Search Report dated Jan. 26, 2021.
European Search Report dated Jul. 7, 2022.

*Primary Examiner* — Kelly L Jerabek
(74) *Attorney, Agent, or Firm* — Cha & Reiter, LLC

(57) ABSTRACT

An electronic device comprises a camera; a memory configured to store a plurality of tone mapping information sets, each of the tone mapping information sets comprising image information of an image frame and tone mapping information of the image frame; and a processor, wherein the processor is configured to: select a tone mapping information set based on user input; acquire a first image frame captured through the camera; obtain a first feature of the first image frame by analyzing the first image frame; identify a second feature of second image frame corresponding to the selected tone mapping information set, based on image information of the second image frame; compare the first feature and the second feature; based on the comparison result, apply tone mapping to the first image frame using tone mapping information of the second image frame; and store image data of the first image frame, in the memory.

18 Claims, 10 Drawing Sheets

(51) Int. Cl.
*H04N 5/232* (2006.01)
*G06T 5/50* (2006.01)

(52) U.S. Cl.
CPC ... *H04N 5/23229* (2013.01); *H04N 5/232939* (2018.08); *G06T 2207/20004* (2013.01); *G06T 2207/20208* (2013.01)

(56) References Cited

U.S. PATENT DOCUMENTS

| | | |
|---|---|---|
| 2011/0292246 A1 | 12/2011 | Brunner |
| 2015/0078661 A1 | 3/2015 | Granados et al. |
| 2015/0170389 A1 | 6/2015 | Ming et al. |
| 2018/0025477 A1 | 1/2018 | Min et al. |
| 2018/0096467 A1* | 4/2018 | Chesnokov ............... G06T 5/50 |
| 2018/0218481 A1 | 8/2018 | Evans et al. |
| 2019/0043233 A1 | 2/2019 | Kim et al. |
| 2019/0052790 A1 | 2/2019 | Kang et al. |
| 2019/0068865 A1* | 2/2019 | Guerin ............... H04N 5/23229 |
| 2019/0156471 A1 | 5/2019 | Knibbeler et al. |
| 2020/0134792 A1* | 4/2020 | Mandal .................... G06T 5/40 |

\* cited by examiner

IMAGE PROCESSING METHOD AND ELECTRONIC DEVICE SUPPORTING THE SAME

CROSS-REFERENCE TO RELATED APPLICATION(S)

This application is based on and claims priority under 35 U.S.C. 119 to Korean Patent Application No. 10-2019-0120870, filed on Sep. 30, 2019, in the Korean Intellectual Property Office, the disclosure of which is herein incorporated by reference in its entirety.

TECHNICAL FIELD

Certain embodiments of the disclosure relate to an image processing technology.

BACKGROUND ART

Recently, digital camera functions, such as standalone digital cameras, digital camcorders, or digital cameras/camcorders incorporated into a smartphone, have become widespread. The electronic device including the camera may provide various functions related to image capturing. For example, the electronic device may output a preview image, acquired from the camera, to a display, and may acquire a captured image from the camera when a shutter operates.

It is important to provide a good quality image that is visually pleasing to the user.

SUMMARY

An electronic device according to certain embodiments comprises a camera; a memory configured to store a plurality of tone mapping information sets, each of the tone mapping information sets comprising image information of an image frame and tone mapping information of the image frame; and a processor, wherein the processor is configured to: select a tone mapping information set based on user input from among the plurality of tone mapping information sets; acquire a first image frame captured through the camera; obtain a first feature of the first image frame by analyzing the first image frame; identify a second feature of second image frame corresponding to the selected tone mapping information set, based on image information of the second image frame in the selected tone mapping information set; compare the first feature and the second feature; based on the comparison result, apply tone mapping to the first image frame using tone mapping information of the second image frame in the selected tone mapping information set; and store image data of the first image frame, in the memory.

An image processing method of an electronic device according to certain embodiments, comprises: selecting a tone mapping information set based on user input from among a plurality of tone mapping information sets, each of the tone mapping information sets comprising image information of an image frame and tone mapping information of the image frame stored in a memory of the electronic device; acquiring a first image frame captured through a camera of the electronic device; obtaining a first feature of the first image frame by analyzing the first image frame; identifying a second feature of second image frame corresponding to the selected tone mapping information set, based on image information of the second image frame in the selected tone mapping information set; comparing the first feature and the second feature; based on the comparison result, applying tone mapping to the first image frame using tone mapping information of the second image frame in the selected tone mapping information set; and storing image data of the first image frame in the memory.

BRIEF DESCRIPTION OF DRAWINGS

The same or similar reference numerals in the drawings may be used for the same or similar components.

DETAILED DESCRIPTION

Figure 1:
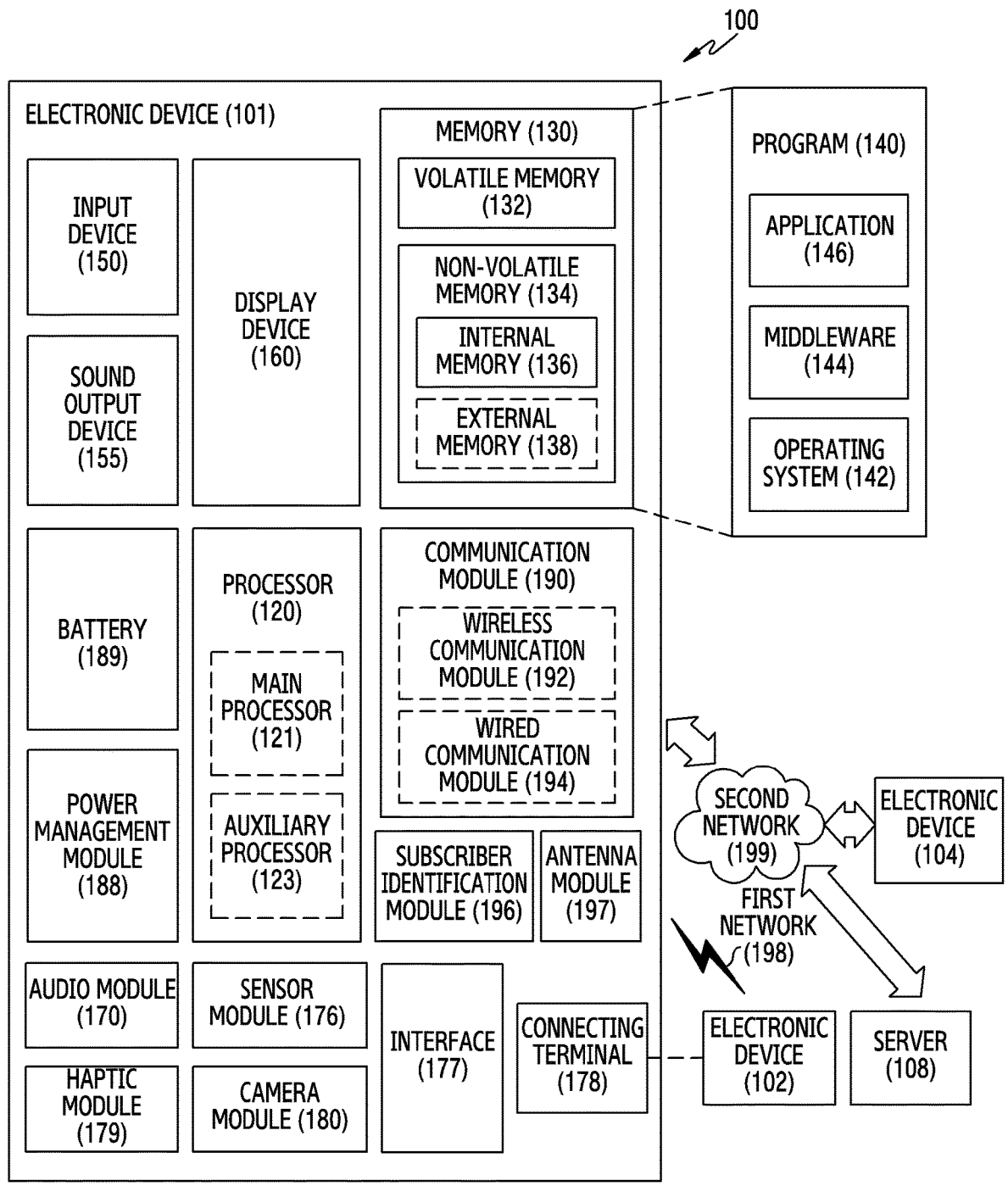
FIG. 1 is a block diagram of an electronic device in a network environment according to certain embodiments.

The electronic device may provide a function such as automatic focus adjustment, automatic exposure setting, zoom in, zoom out, continuous shooting, timer shooting, flash on/off, filtering, or the like.

Meanwhile, the electronic device including the camera may apply a technology (e.g., a High Dynamic Range (HDR)) for representing a visible range of light to an image in order to reduce the difference between a background or subject actually viewed by a user and an image obtained by capturing the background or subject. In case of the HDR, a range of representing image data captured by the camera, for example, a grayscale range, is wider than a Standard Dynamic Range (SDR). Therefore, an HDR image may be represented such that a bright region of the image is brighter and a dark region of the image is darker, compared to an SDR image.

The HDR technology may include a static tone mapping scheme (e.g., HDR 10) in which the same tone mapping information is uniformly applied to image frames included in one image and a Dynamic Tone Mapping (DTM) scheme (e.g., HDR 10+ or Dolby vision) in which different tone mapping information is applied in unit of image frames. In the static tone mapping scheme, since the same tone mapping information is applied even if an image has image frames with many scene changes or brightness differences, it may be difficult to optimize the image in units of image frames. On the other hand, in the DTM scheme, since independent tone mapping information is applied for each image frame or scene, image quality can be represented realistically, and a producer's intention can be accurately reflected.

However, in order to produce the image of the DTM scheme, there may be a need for high-spec equipment, professional mastering technologies, and specialized tools. In addition, when producing the image of the DTM scheme, and professional or delicate DTM operation. Since it may be difficult for an individual to produce the image of the DTM scheme, a user may have no choice but to view a reproduced image by interpreting an image produced by a professional company such as a movie company in the same manner as in the DTM scheme applied when the image is captured. In addition, even if the user directly generates (or records) an image by using a camera of an electronic device, there is no choice but to generate the image by using a DTM scheme pre-set by a manufacturer of the electronic device. Accordingly, it may be difficult for the electronic device to generate or reproduce an image suitable for a user's preference or taste when generating or reproducing the image.

Certain embodiments of the disclosure may provide an image processing method which applies a DTM scheme based on a user's preference when generating or reproducing an image, and an electronic device supporting the method.

According to certain embodiments of the disclosure, since a Dynamic Tone Mapping (DTM) scheme is selected based on a user's preference when generating or reproducing an image, the image can be generated or reproduced by reflecting the user's preference.

In addition thereto, various effects which are directly or indirectly understood through this document can be provided.

Hereinafter, certain embodiments of the disclosure will be described in detail with reference to the accompanying drawings. For example, components shown in the drawings may be exaggerated or reduced in size for convenience of explanation, and the disclosure is not necessarily limited thereto.

FIG. 1 is a block diagram illustrating an electronic device 101 that incorporates a camera function according to certain embodiments. The electronic device 101 is in a network environment 100. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera 180, a power management module 188, a battery 189, a communication module 190, a subscriber identification module (SIM) 196, or an antenna module 197. In some embodiments, at least one of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera 180 or the communication module 190) functionally related to the auxiliary processor 123.

The term processor 120 can be a single processor or multiple processors. Accordingly, the term "processor" as used in this document shall be understood to refer to the singular and plural contexts.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In certain embodiments, processor 120 may provide an image processing method which applies a DTM scheme based on a user's preference when generating or reproducing an image captured by the camera 180.

According to certain embodiments of the disclosure, since a Dynamic Tone Mapping (DTM) scheme is selected based on a user's preference when generating or reproducing an image, the image can be generated or reproduced by reflecting the user's preference.

Figure 2:
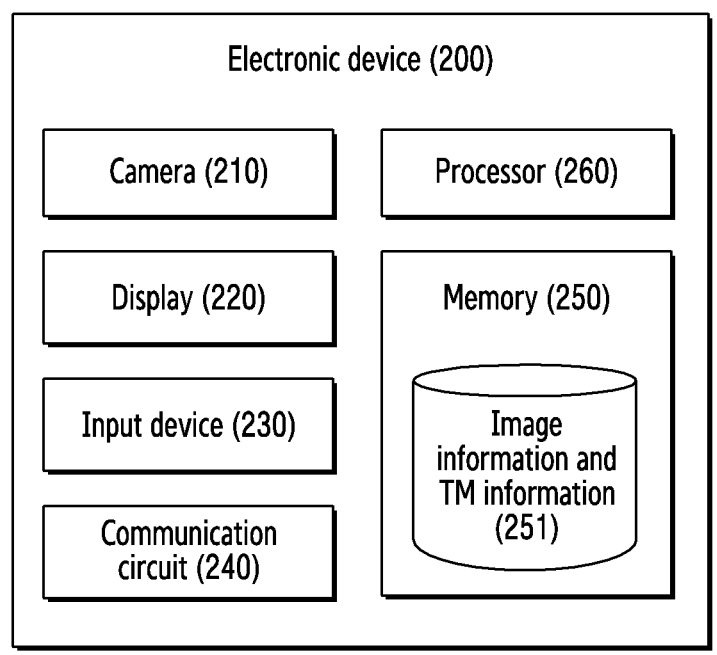
FIG. 2 illustrates an electronic device for image processing according to an embodiment of the disclosure.

FIG. 2 illustrates an electronic device for image processing according to an embodiment of the disclosure.

Referring to FIG. 2, an electronic device 200 (e.g., the electronic device 101) may provide an image processing function such as image generation or reproduction. For example, the electronic device 200 may generate (or record) a captured image through a capturing function using a camera 210 (such as camera 180). The captured image can include one or more image frames. The electronic device 200 may display (or reproduce) the captured image on a display 220 (such as display device 160). In addition, the electronic device 200 may apply a High Dynamic Range (HDR) to an image in order to provide an image with reality realistic appearance. In particular, the electronic device 200 may provide a more realistic image through a Dynamic Tone Mapping (DTM) scheme which applies different tone mapping information (hereinafter, referred to as TM information) to different image frames included in the image. In this case, the electronic device 200 may apply the DTM scheme based on the user's preference to support generation or reproduction of an image by reflecting a user's preference.

The electronic device 200 for performing the aforementioned function may include the camera 210 (e.g., the camera 180), the display 220 (e.g., the display device 160), an input device 230 (e.g., the input device 150), a communication circuit 240 (e.g., the communication module 190), a memory 250 (e.g., the memory 130), and a processor 260 (e.g., the processor 120). However, the structure of the electronic device 200 is not limited thereto. According to certain embodiments, the electronic device 200 may omit at least one of the aforementioned components, and may further include at least one different component.

The camera 210 may capture a still picture and a moving picture. To this end, the camera 210 may include an imaging device. The imaging device may include, for example, at least one of a lens which receives image light of a subject to form an image, an aperture which adjusts an amount of light passing through the lens, a shutter which functions to open and close the aperture so that an image sensor is exposed for a specific time due to the light passing through the lens, an image sensor which receives an image formed on the lens as an optical signal, and an internal memory. The image can include one or more image frames.

The display 220 may display, for example, a variety of content (e.g., a text, an image, a video, an icon, a symbol, etc.) to the user. For example, the display 220 may display an image captured through the camera 210. According to an embodiment, the display 220 may include a touch screen, and may receive, for example, a touch, gesture, proximity, or hovering input using an electronic pen or a user's body part.

The input device 230 may receive a command or data from the outside (e.g., the user) of the electronic device 200. For example, the input device 230 may receive a user input. According to an embodiment, the input device 230 may include an input sensing circuit (e.g., a touch panel and/or a digitizer) which senses an approach or contact of a user's body part or an electronic pen. In addition, the input sensing circuit may be stacked such that a display panel of the display 220 overlaps with at least some regions or may be provided integrally with the display 220. In this case, the input sensing circuit and the display 220 may be referred to as a touch screen display (or a touch screen).

The communication circuit 240 may support communication between the electronic device 200 and an external electronic device. According to an embodiment, the communication circuit 240 may receive an image from the external electronic device.

The memory 250 may store a variety of data used by at least one component of the electronic device 200. For example, the memory 250 may store a command and data related to image processing. When the command is executed by the processor 260, the processor 260 may perform a function corresponding to the command. According to an embodiment, the memory 250 may store an image captured through the camera 210, and may store an image received from the external electronic device through the communication circuit 240.

According to an embodiment, the memory 250 may store image information and TM information 251 for each of the image frames included in an image. The image information may include at least one of image data of a corresponding image frame, sub-sampling data of the image data, Differential Pulse Code Modulation (DPCM) data of the image data, information on a feature point of the image data, and frequency-domain data of the image data. According to an embodiment, the frequency-domain data may refer to data of a Low-Low (LL) band after wavelet conversion, or may refer to a DC value after N×N Discrete Cosine Transform (DCT) conversion. For example, the memory 250 may store image data of an image frame without alteration, or may store image data subjected to image data processing (e.g., compression) to reduce an amount of data to be stored.

The TM information may include at least one of tone mapping metadata corresponding to a tone mapping curve applied to a corresponding image frame and information on a plurality of knee points (e.g., curve anchors including knee points) of the tone mapping curve. The tone mapping metadata may include, for example, minimum/maximum brightness of an image, backlight peaking information indicating a brightness mapping parameter of a display backlight unit, a color specification indicating a color gamut and temperature of the image, a transfer parameter indicating a gamma and Contrast Enhancement (CE) control parameter, scene information such as indoor/outdoor, night/day, or the like, histogram information indicating minimum/maximum/optimal pixel value information, a sharpness parameter indicating intensity information of a boundary region of the image.

According to an embodiment, the memory 250 may store the image information and TM information 251 of each of image frames in pair called a tone mapping information set (hereinafter, referred to as a TM information set). In addition, the memory 250 may store the information by classifying the information for each category, based on attributes of identification information capable of respectively identifying a plurality of TM information sets. The identification information may include, for example, information on a movie company or director by which an image is produced, or information on a production year or genre of the image.

The processor 260 may control at least one different component of the electronic device, and may perform a variety of data processing or computations. The processor 260 may select a TM information set based on a user's preference, as expressed by user input, from among the plurality of TM information sets including the image information and TM information 251 of each of a plurality of image frames stored in the memory 250. For example, the processor 260 may display identification information identifying the plurality of TM information sets on the display 220. The processor 260 may then receive a user input selecting any one identification information through the input device 230. The processor may then a select TM information set corresponding to the selected identification information as the TM information set based on the user's preference. It shall be understood that the processor 260 selecting a TM information set based on user input is not limited to a user input explicitly selecting the TM information set, but can be an implied TM information set based on user input, or an algorithm selecting the TM information set based on previous user inputs and patterns of usage.

Herein, the identification information may include, for example, information on a movie company or director by which an image is produced, or information on a production year or genre of the image. For another example, the processor 260 may acquire selection history information on each of the plurality of TM information sets stored in the memory 250, and may select the TM information set based on the user's preference from among the plurality of TM information sets, based on the acquired selection history information. For example, the processor 260 may select the most frequently selected TM information set or the most recently selected TM information set as the TM information set based on the user's preference.

According to an embodiment, the processor 260 may acquire a capture image captured through the camera 210, and may analyze a feature of image frames included in the acquired capture image. For example, the processor 260 may extract a feature point (e.g., an edge, a boundary point, etc.), analyze a histogram, or analyze a frequency domain with respect to each of the image frames included in the capture image. The processor 260 may acquire at least one of sub-sampling data, Differential Pulse Code Modulation (DPCM) data, information on a feature point, and frequency-domain data with respect to image data of each of the image frames included in the capture image.

According to an embodiment, the processor 260 may identify a feature of image frames of the image information of the selected TM information set. Herein, the image information may include at least one of image data of the image frame, sub-sampling data of the image data, DPCM data of the image data, information on a feature point of the image data, and frequency-domain data of the image data. Accordingly, when the image information includes at least one of sub-sampling data, DPCM data, information on a feature point, and frequency-domain data with respect to image data of each of the image frames included in the capture image, the processor 260 may directly use the image information. However, when the image information includes only image data of each of the image frames corresponding to the selected TM information set, the processor 260 may perform a process of acquiring at least one of sub-sampling data, DPCM data, information on a feature point, and frequency-domain data with respect to the image data, through feature point extraction, histogram analysis, frequency-domain analysis, or the like using the image data.

The processor 260 may compare the feature of image frames included in the capture image and the feature of image frames of the image information of the selected TM information set. In addition, based on the comparison result, the processor 260 may apply tone mapping to at least one image frame included in the capture image, by using TM information included in the selected TM information set. For example, if the comparison result determines that a similarity of any one image frame (e.g., a first image frame) included in the capture image and any one image frame (e.g., a second image frame) among the image frames corresponding to the selected TM information set is greater than or equal to a specified size, the processor 260 may apply tone mapping to the image frame (e.g., the first image frame) included in the capture image by using TM information of the image frame (e.g., the second image frame) included in the selected TM information set. Herein, the processor 260 may apply tone mapping by using TM information corresponding to each of all image frames having a similarity greater than or equal to a specified size, instead of applying tone mapping only to any one image frame. In some embodiments, if the comparison result determines that there is no image frame having the similarity greater than or equal to the specified size, the processor 260 may apply tone mapping to image frames included in the capture image, based on configuration information. Herein, the configuration information may include, for example, TM information configured by default in the electronic device 200 or TM information generated by the processor 260, based on the capture image.

The processor 260 may store (or record or write) image data of the capture image, to which tone mapping is applied, in the memory 250. According to an embodiment, the processor 260 may generate tone mapping metadata of the capture image by using information on an image frame of the capture image to which the tone mapping is applied, and may store the generated tone mapping metadata in the memory 250 together with the image data of the capture image.

According to an embodiment, the processor 260 may receive an image from an external electronic device through the communication circuit 240. For example, the processor 260 may acquire an image such as a movie from an operating server of a Contents Provider (CP) (which can be a movie company) through the communication circuit 240. The processor 260 may analyze a feature of image frames included in the image received from the external electronic device to acquire image information and TM information of each of the image frames included in the image. In addition, the processor 260 may store the acquired image information and TM information in the memory 250 as a TM information set. That is, the processor 260 may accumulate a new TM information set in the memory 250, through the image received from the external electronic device.

According to an embodiment, the processor 260 may display (or reproduce) an image pre-stored in the memory 250 on the display 220. In addition, the processor 260 may receive the user input through the input device 230, in a state where the image is displayed on the display 220. Herein, the user input may be an input of selecting a scene preferred by a user from the image displayed on the display 220. Upon receiving the user input, the processor 260 may identify at least one image frame among image frames included in the image, based on the user input. For example, the processor 260 may identify an image frame corresponding a scene selected by the user. In addition, the processor 260 may analyze a feature of the identified image frame to acquire image information and TM information of the image frame, and may store the acquired image information and TM information in the memory 260 as a TM information set. That is, the processor 260 may accumulate a new TM information set in the memory 260, through a user preference indication (e.g., a user input) in the image displayed on the display 220.

According to an embodiment, when the capture image is stored (or recorded), the processor 260 may apply DTM to the capture image. In addition, when an image stored in the memory 250 is reproduced, the processor 260 may apply the DTM to the reproduced image. For example, upon receiving a command (e.g., an image reproduction command) for reproducing the image pre-stored in the memory 250, the processor 260 may select a TM information set based on a user's preference from among the plurality of TM information sets stored in the memory 250. In addition, the processor 260 may analyze a feature of image frames included in an image to be reproduced (hereinafter, referred to as a reproduction image), identify a feature of image frames corresponding to the selected TM information set, based on image information included in the selected TM information set, and compare the feature of the image frames included in the reproduction image and the feature of the image frames corresponding to the selected TM information set. Thereafter, based on the comparison result, the processor 260 may apply tone mapping to at least one image frame included in the capture image, by using at least one piece of TM information included in the selected TM information set, and may display the reproduction image, to which the tone mapping is applied, on the display.

As described above, according to certain embodiments, an electronic device (e.g., the electronic device 101 or the electronic device 200) may include a camera (e.g., the camera 180 or the camera 210), a memory (e.g., the memory 130 or the memory 250) configured to store a plurality of tone mapping information sets including image information and tone mapping information of each of a plurality of image frames, and a processor (e.g., the processor 120 or the processor 260). The processor may be configured to select a TM information set based on a user's preference from among the plurality of TM information sets, acquire a first image captured through the camera, analyze a feature of image frames included in the acquired first image, identify a feature of image frames corresponding to the selected TM information set, based on image information included in the selected TM information set, compare the feature of the image frames included in the acquired first image and the feature of the image frames corresponding to the selected TM information set, apply tone mapping to at least one image frame included in the acquired first image, by using at least one TM information included in the selected TM information set, based on the comparison result, and store image data of the first image, to which the tone mapping is applied, in the memory.

According to certain embodiments, the processor may be configured to apply tone mapping to the first image frame by using TM information of a second image frame included in the selected TM information set, if the comparison result determines that a similarity of the first image frame included in the acquired first image and the second image frame among image frames corresponding to the selected TM information set is greater than or equal to a specified size.

According to certain embodiments, the processor may be configured to generate metadata of the first image by using information on the at least one image frame to which the tone mapping is applied, and store the generated metadata in the memory together with image data of the first image. The metadata of the first image may include at least one of minimum and/or maximum brightness of the first image, backlight peaking information indicating a brightness mapping parameter of a display backlight unit, a color specification indicating a color gamut and temperature of the first image, a transfer parameter indicating a gamma and Contrast Enhancement (CE) control parameter, scene information, histogram information indicating minimum/maximum/optimal pixel value information, and a sharpness parameter indicating intensity information of a boundary region of the first image.

According to certain embodiments, the electronic device may further include a display (e.g., the display device 160 or the display 220) and an input device (e.g., the input device 150 or the input device 230). The processor may be configured to display on the display pieces of identification information respectively capable of identifying the plurality of TM information sets, receive a user input for selecting any one piece of identification information from among the pieces of identification information through the input device, and select a TM information set corresponding to the selected identification information as a TM information set based on the user's preference.

According to certain embodiments, the electronic device may further include a communication circuit (e.g., the communication module 190 or the communication circuit 240). The processor may be configured to receive a second image from an external electronic device through the communication circuit, acquire image information and TM information of each of image frames included in the received second image, and store the acquired image information and TM information in the memory as the TM information set.

According to certain embodiments, the electronic device may further include a display (e.g., the display device 160 or the display 220) and an input device (e.g., the input device 150 or the input device 230). The processor may be configured to display on the display a second image which is pre-stored in the memory, receive a user input through the input device, in a state where the second image is displayed on the display, identify at least one image frame among image frames included in the second image, based on the user input, acquire image information and TM information of the identified at least one image frame, and store the acquired image information and tone mapping image in the memory as the TM information set.

According to certain embodiments, the image information of each of the plurality of image frames may include at least one of image data of each image frame, sub-sampling data of the image data, Differential Pulse Code Modulation (DPCM) data of the image data, information on a feature point of the image data, and frequency-domain data of the image data.

According to certain embodiments, the TM information of each of the plurality of image frames may include at least one of tone mapping metadata corresponding to a tone mapping curve applied to each image frame and information on a plurality of knee points of the tone mapping curve.

According to certain embodiments, the plurality of TM information sets may be stored by being classified for each category, based on attributes of pieces of identification information capable of respectively identifying the plurality of TM information sets.

According to certain embodiments, the electronic device may further include a display. The processor may be configured to receive a command for reproducing a second image pre-stored in the memory, select a TM information set based on a user's preference from among the plurality of TM information sets, analyze a feature of image frames included in the second image, identify a feature of image frames corresponding to the selected TM information set, based on image information included in the selected TM information set, compare the feature of the image frames included in the second image and the feature of the image frames corresponding to the selected TM information set, apply tone mapping to at least one image frame included in the second image, by using at least one TM information included in the selected TM information set, based on the comparison result, and display on the display the second image to which the tone mapping is applied.

Figure 3:
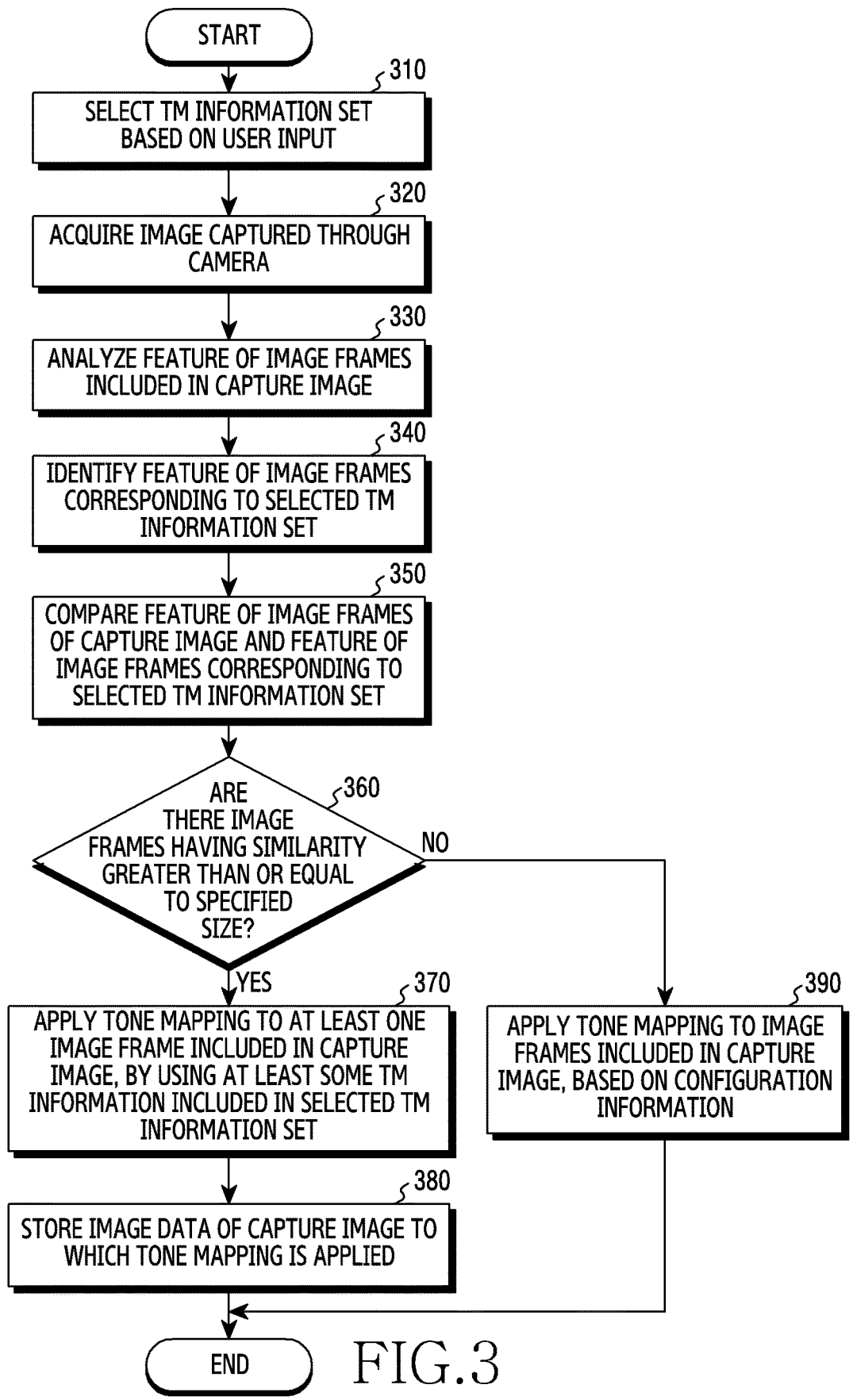
FIG. 3 illustrates an image processing method according to an embodiment of the disclosure.

FIG. 3 illustrates an image processing method according to an embodiment of the disclosure.

Referring to FIG. 3, in operation 310, a processor (e.g., the processor 260) of an electronic device (e.g., the electronic device 200) may select a TM information set based on user input from among a plurality of TM information sets. The TM information sets include image information and TM information (e.g., the image information and TM information 251) of each of a plurality of image frames stored in a memory (e.g., the memory 250). For example, the processor may display identification information identifying the plurality of TM information sets on a display (e.g., the display 220). The user can provide an input for selecting any one identification information from among the identification information through an input device (e.g., the input device 230). The TM information set corresponding to the selected identification information is then used. The TM information set selection by user input is not limited to explicit selection. For another example, the processor may acquire selection history (as indicated by user inputs) information on each of the plurality of TM information sets stored in the memory, and may select the TM information set based on the selection history. For example, the processor may select the most frequently selected TM information set by previous user inputs or the most recently selected TM information set as the TM information set based on the most previous user input.

In operation 320, the processor may acquire an image (a capture image) captured through a camera (e.g., the camera 210). The image may include one or more image frames.

In operation 330, the processor may analyze a feature of the one or more image frames included in the capture image. For example, the processor may perform feature point extraction, histogram analysis, frequency domain analysis, or the like for each of the image frames included in the capture image. Accordingly, the processor may acquire at least one of sub-sampling data, DPCM data, information on a feature point, and frequency-domain data with respect to image data of each of the image frames included in the capture image.

In operation 340, the processor may identify a feature of image frames corresponding to the selected TM information set. For example, the processor may identify a feature of image frames, based on image information included in the selected TM information set. When the image information includes at least one of sub-sampling data, DPCM data, information on a feature point, and frequency-domain data with respect to image data of each of the image frames included in the capture image, the processor may directly use the image information. For another example, when the image information includes only image data of each of the image frames corresponding to the selected TM information set, the processor may perform a process of acquiring at least one of sub-sampling data, DPCM data, information on a feature point, and frequency-domain data with respect to the image data, through feature point extraction, histogram analysis, frequency-domain analysis, or the like using the image data.

In operation 350, the processor may compare the feature of image frames included in the capture image and the feature of image frames corresponding to the selected TM information set.

In operation 360, based on the comparison result, the processor may determine whether there are image frames having a similarity greater than or equal to a specified size. For example, based on the comparison result, the processor may determine whether a similarity of any one image frame (e.g., a first image frame) included in the capture image and any one image frame (e.g., a second image frame) among the image frames corresponding to the selected TM information set is greater than or equal to a specified size.

In the presence of the image frames having the similarity greater than or equal to the specified size, in operation 370, the processor may apply tone mapping to at least one image frame included in the capture image, by using at some of the TM information included in the selected TM information set. For example, if the comparison result determines that a similarity of any one image frame (e.g., a first image frame) included in the capture image and any one image frame (e.g., a second image frame) among the image frames corresponding to the selected TM information set is greater than or equal to a specified size, the processor may apply tone mapping to the image frame (e.g., the first image frame) included in the capture image by using TM information of the image frame (e.g., the second image frame) included in the selected TM information set. Herein, the processor may apply tone mapping by using TM information corresponding to each of all image frames having a similarity greater than or equal to a specified size, instead of applying tone mapping only to any one image frame.

In operation 380, the processor may store (or record) image data of the capture image, to which tone mapping is applied, in the memory. According to an embodiment, the processor may generate tone mapping metadata of the capture image by using information on an image frame of the capture image to which the tone mapping is applied, and may store the generated tone mapping metadata in the memory together with the image data of the capture image.

If there is no image frame having the similarity greater than or equal to the specified size, in operation 390, the processor may apply tone mapping to image frames included in the capture image, based on configuration information. Herein, the configuration information may include, for example, TM information configured by default in the electronic device or TM information generated by the processor, based on the capture image.

Figure 4:
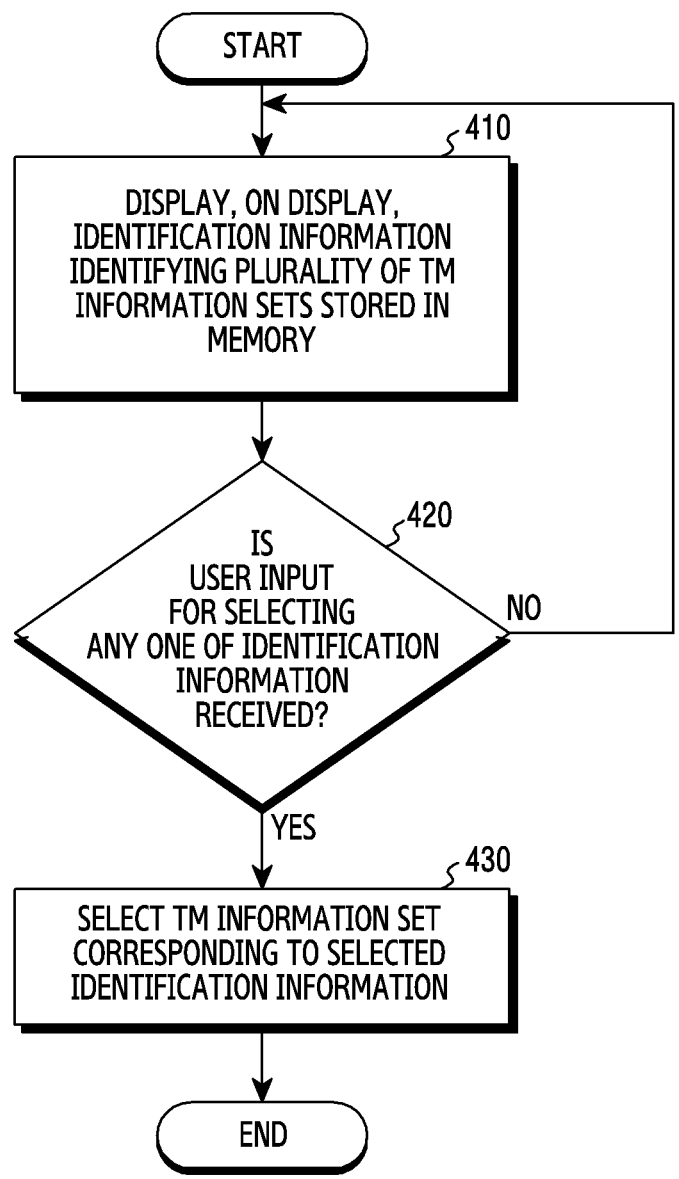
FIG. 4 illustrates a method of selecting a tone mapping information set, based on a user input, according to an embodiment of the disclosure.
Figure 5:
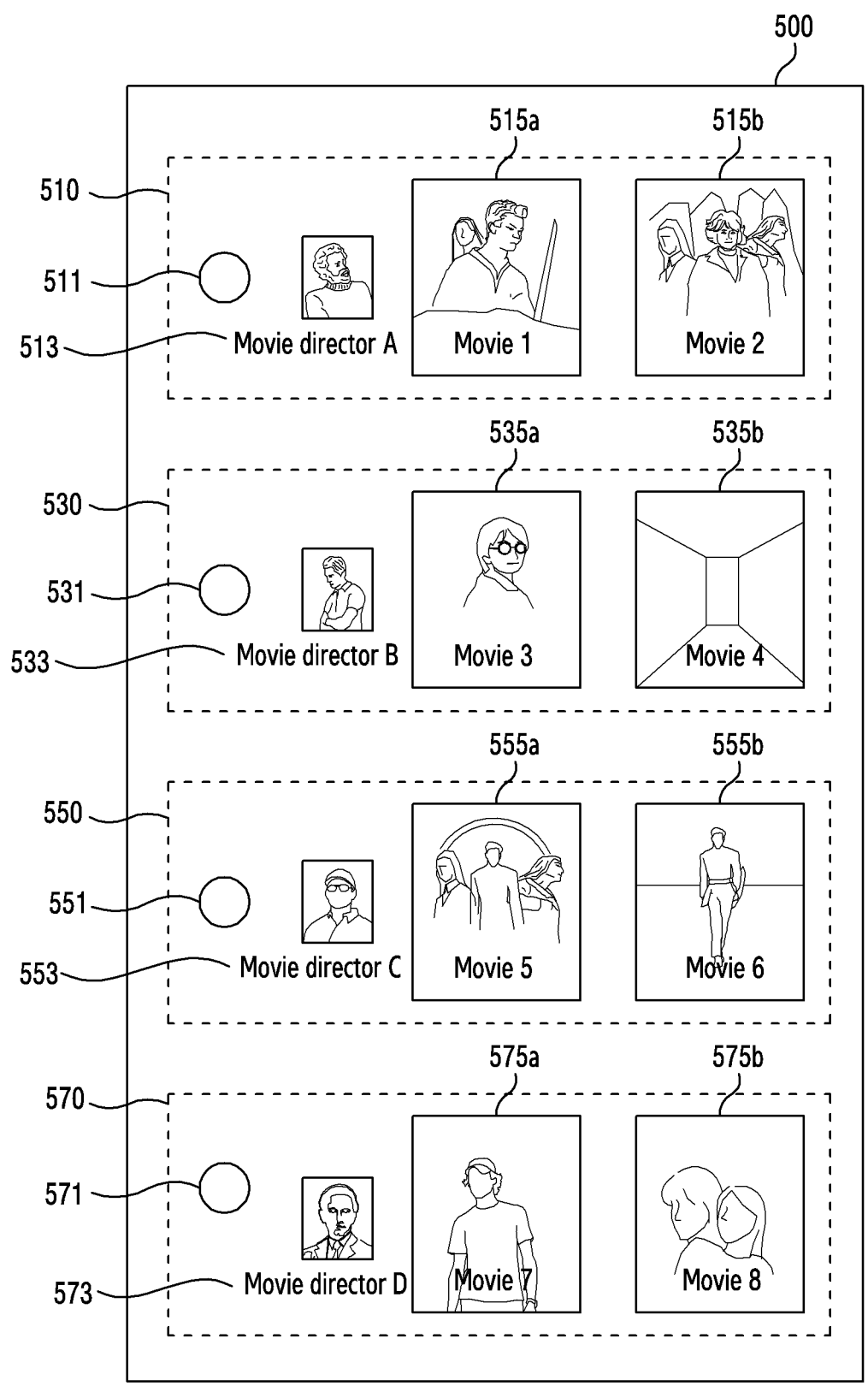
FIG. 5 is an exemplary view of a screen for selecting a tone mapping information set, based on a user input, according to an embodiment of the disclosure.

FIG. 4 illustrates a method of selecting a TM information set, based on a user input, according to an embodiment of the disclosure, and FIG. 5 is a view of a screen for selecting a TM information set, based on a user input, according to an embodiment of the disclosure.

Referring to FIG. 4 and FIG. 5, in operation 410, a processor (e.g., the processor 260) of an electronic device (e.g., the electronic device 200) may display, on a display (e.g., the display 220), identification information identifying a plurality of TM information sets including image information and TM information (e.g., the image information and TM information 251) of each of the plurality of image frames stored in a memory (e.g., the memory 250). For example, as shown in FIG. 5, the processor may display, on the display, a screen 500 including identification information 510, 530, 550, and 570 respectively for the plurality of TM information sets.

The identification information 510, 530, 550, and 570 may include, for example, information about a movie company or director by which an image is produced, or information on a production year or genre of the image. FIG. 5 shows a state in which the pieces of identification information 510, 530, 550, and 570 respectively include information 513, 533, 553, and 573 for a director and information 515a, 515b, 535a, 535b, 555a, 555b, 575a, and 575b for a movie shot by the director. In addition, the pieces of identification information 510, 530, 550, and 570 may include objects, for example, button objects 511, 531, 551, and 571, capable of selecting any one of the pieces of identification information 510, 530, 550, and 570. For example, upon selecting the first button object 511 from among the pieces of identification information 510, 530, 550, and 570 through a user input, a first TM information set corresponding to the first identification information 510 may be selected. Upon selecting the second button object 531, a second TM information set corresponding to the second identification information 530 may be selected. Upon selecting the third button object 551, a third TM information set corresponding to the third identification information 550 may be selected. Upon selecting the fourth button object 571, a fourth TM information set corresponding to the fourth identification information 570 may be selected.

In operation 420, the processor may receive through an input device (e.g., the input device 230) a user input for selecting any one of the pieces of identification information 510, 530, 550, and 570 displayed on the display. For example, the processor may receive a user input for selecting the button objects 511, 531, 551, and 571 respectively included in the pieces of identification information 510, 530, 550, and 570. In certain embodiments, the user input may be a touch input on the identification information 510, 530, 550, and 570.

In operation 430, the processor may select a TM information set corresponding to the selected identification information, based on the user input. For example, when the first button object 511 included in the first identification information 510 is selected by the user input, the processor may select a first TM information set corresponding to the first identification information 510 as a TM information set based on a user's preference. Likewise, when the second button object 531 included in the second identification information 430, the third button object 551 included in the third identification information 550, and the fourth button object 571 included in the fourth identification information 570 are selected by the user input, the processor may respectively select a second TM information set corresponding to the second identification information 530, a third TM information set corresponding to the third identification information 550, and a fourth TM information set corresponding to the fourth identification information 570 as the TM information set based on the user's preference.

Figure 6:
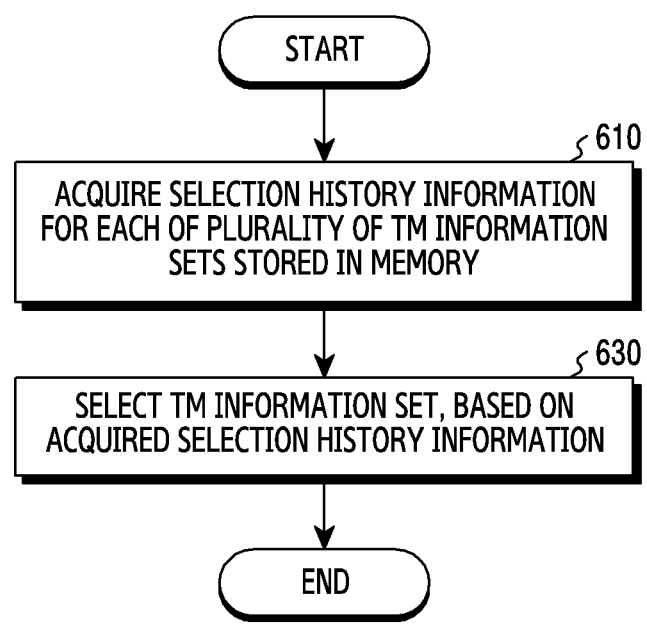
FIG. 6 illustrates a method of selecting a tone mapping information set, based on selection history information of the tone mapping information set, according to an embodiment of the disclosure.

FIG. 6 illustrates a method of selecting a TM information set, based on selection history information of the TM information set, according to an embodiment of the disclosure. The selection history can be determined from previously provided user inputs selecting TM information sets.

Referring to FIG. 6, in operation 610, a processor (e.g., the processor 260) of an electronic device (e.g., the electronic device 200) may acquire selection history information for each of a plurality of TM information sets including image information and TM information (e.g., the image information and TM information 251) of each of a plurality of image frames stored in a memory (e.g., the memory 250). The selection history information may include information on a selection count, selection timing, or the like for each of the plurality of TM information sets.

In operation 630, the processor may select the TM information set based on the user's preference from among the plurality of TM information sets, based on the acquired selection history information. For example, the processor may select the most frequently selected TM information set or the most recently selected TM information set as the TM information set based on the user's preference.

Figure 7:
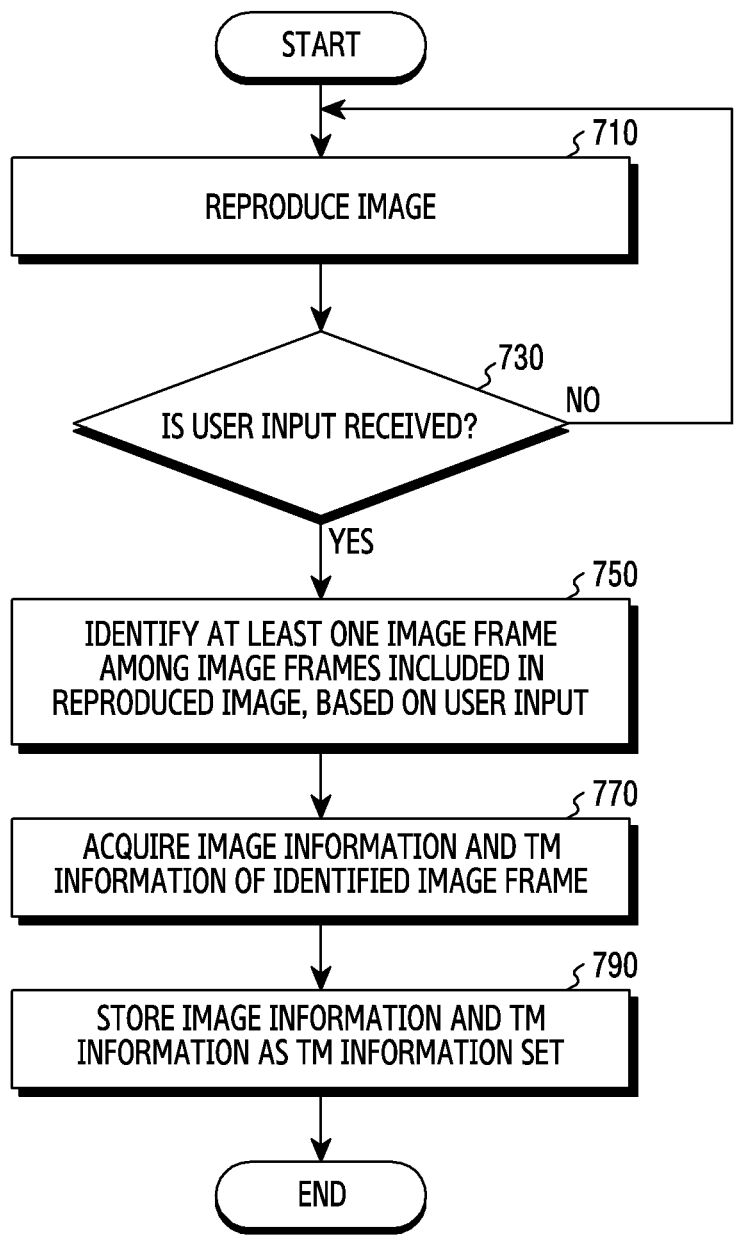
FIG. 7 illustrates a method of storing image information and tone mapping information of an image frame selected based on a user input when reproducing an image according to an embodiment of the disclosure.

FIG. 7 illustrates a method of storing image information and TM information of an image frame selected based on a user input when reproducing an image according to an embodiment of the disclosure.

Referring to FIG. 7, in operation 710, a processor (e.g., the processor 260) of an electronic device (e.g., the electronic device 200) may reproduce or display an image pre-stored in a memory (e.g., the memory 250). For example, the processor may display the image pre-stored in the memory on a display (e.g., the display 220).

In operation 730, the processor may receive a user input while the image is reproduced. For example, the processor may receive the user input through an input device (e.g., the input device 230), in a state where the image is displayed on the display. Herein, the user input may be an input for selecting at least one scene by a user (e.g., a scene preferred by the user) from the image displayed on the display.

In operation 750, the processor may identify at least one image frame among image frames included in the reproduced image, based on the user input. For example, the processor may identify at least one image frame corresponding to at least one scheme selected by the user, from the image.

In operation 770, the processor may acquire image information and TM information of the identified image frame. For example, the processor may analyze a feature of the identified at least one image frame and thus may acquire image information and TM information of the identified at least one image frame. According to an embodiment, the processor may acquire at least one of sub-sampling data, DPCM data, information on a feature point, and frequency-domain data with respect to the at least one image frame, through feature point extraction, histogram analysis, frequency-domain analysis, or the like for the identified at least one image frame. For example, image information of the identified image frame may include at least one of image data of the identified image frame, sub-sampling data of the image data, DPCM data of the image data, information on a feature point of the image data, and frequency-domain data of the image data. In addition, the TM information of the identified image frame may include at least one of tone mapping metadata corresponding to a tone mapping curve applied to the identified image frame and information on a plurality of knee points of the tone mapping curve.

In operation 790, the processor 260 may store the acquired image information and TM information in the memory as a TM information set. That is, the processor may accumulate a new TM information set in the memory, through a user preference indication (e.g., user input) in the image displayed on the display.

Figure 8:
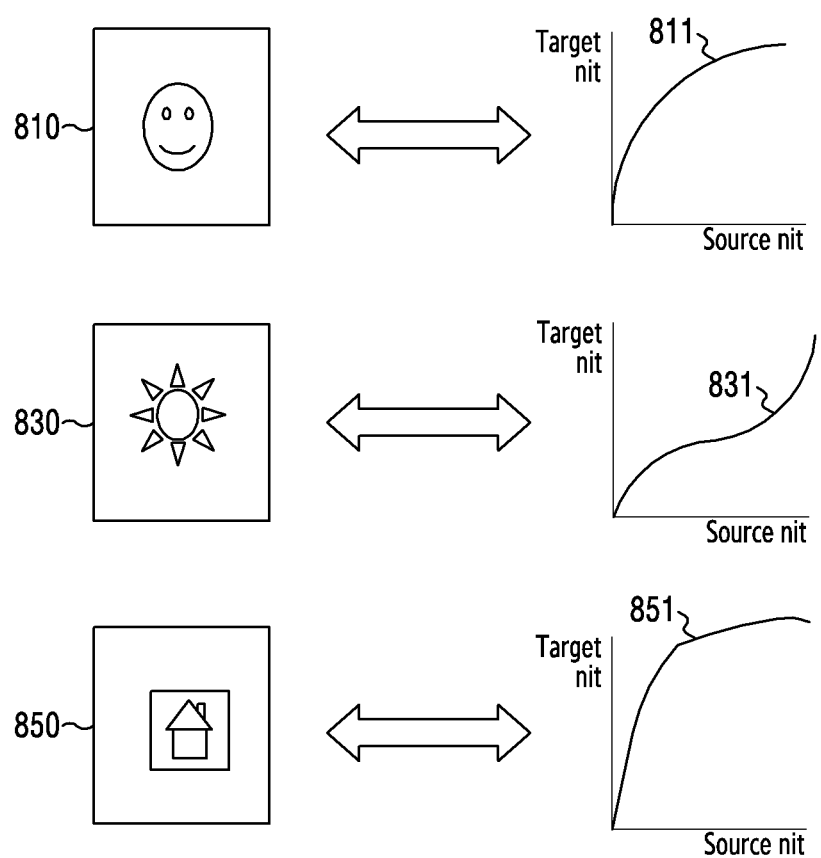
FIG. 8 illustrates a method of storing image information and tone mapping information of an image frame according to an embodiment of the disclosure.

FIG. 8 illustrates a method of storing image information and TM information of an image frame according to an embodiment of the disclosure.

Referring to FIG. 8, a memory (e.g., the memory 250) of an electronic device (e.g., the electronic device 200) may store image information and TM information (e.g., the image information and TM information 251) of each of a plurality of image frames 810, 830, and 850. According to an embodiment, the memory may store the image information and TM information of each of the plurality of image frames 810, 830, and 850 in pair. For example, the image information and the TM information may be stored as a TM information set.

The image information may include image data of the image frames 810, 830, and 850. Alternatively, the image information may include data subjected to image data processing (e.g., compression) to reduce an amount of data to be stored. For example, the image information may include at least one of sub-sampling data of the image data, DPCM data of the image data, information on a feature point of the image data, and frequency-domain data of the image data. According to an embodiment, the frequency-domain data may refer to data of an LL band after wavelet conversion, or may refer to a DC value after N×N DCT conversion.

The TM information may include at least one of tone mapping metadata corresponding to tone mapping curves 811, 831, and 851 applied to the image frames 810, 830, and 850 and information on a plurality of knee points of the tone mapping curves 811, 831, and 851. The tone mapping metadata may include, for example, at least one of minimum/maximum brightness of an image, backlight peaking information indicating a brightness mapping parameter of a display backlight unit, a color specification indicating a color gamut and temperature of the image, a transfer parameter indicating a gamma and Contrast Enhancement (CE) control parameter, scene information such as indoor/outdoor, night/day, or the like, histogram information indicating minimum/maximum/optimal pixel value information, a sharpness parameter indicating intensity information of a boundary region of the image. Alternatively, the TM information may be actual metadata for tone mapping such as ST.2094 or the like.

According to an embodiment, the memory may store the information by classifying the information for each category, based on attributes of identification information identifying a plurality of TM information sets. The identification information may include, for example, information on a movie company or director by which an image is produced, or information on a production year or genre of the image.

Figure 9:
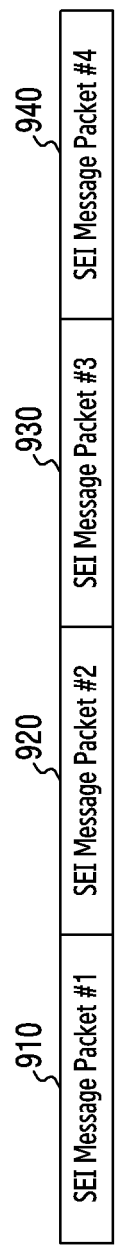
FIG. 9 illustrates a method of transmitting a plurality of pieces of time mapping information from a transmitting end according to an embodiment of the disclosure.
Figure 10:
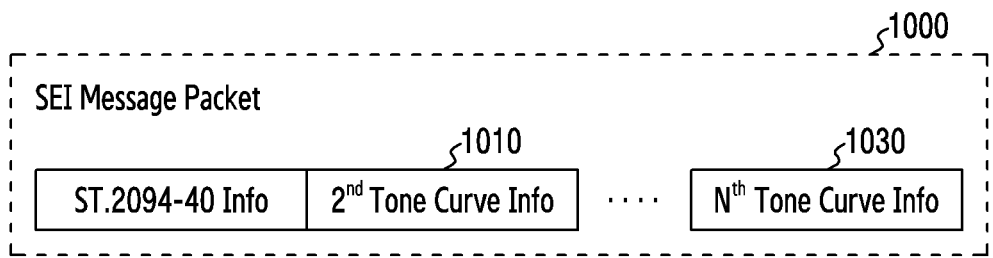
FIG. 10 illustrates another method of transmitting a plurality of pieces of tone mapping information from a transmitting end according to an embodiment of the disclosure.

FIG. 9 illustrates a method of transmitting a plurality of tone mapping information from a transmitting end according to an embodiment of the disclosure, and FIG. 10 illustrates another method of transmitting a plurality of pieces of TM information from a transmitting end according to an embodiment of the disclosure.

According to an embodiment, regarding DTM, metadata of an image may have tone mapping metadata corresponding to one tone mapping curve per image frame. Accordingly, there may be a need for a method of transmitting (or processing) information on a plurality of tone mapping curves to an image processor for processing an image. In this case, the method of transmitting (or processing) the information on the plurality of tone mapping curves preferably maintains compatibility with a method of transmitting (or processing) information on one tone mapping curve. The information on the plurality of tone mapping curves may be transmitted (or processed) by using a Supplemental Enhancement Information (SEI) message of a Network Abstraction Layer (NAL). FIG. 9 illustrates a method of using a multi-SEI message, and FIG. 10 illustrates a method of using a single-SEI message.

Referring to FIG. 9, information on a plurality of tone mapping curves may be included respectively in single-SEI message 910, 920, 930, and 940. For example, information on a first one mapping curve may be included in the first SEI message 910, information on a second tone mapping curve may be included in the second SEI message 920, information on a third tone mapping curve may be included in the third SEI message 930, and information on a fourth tone mapping curve may be included in the fourth SEI message 940. In addition, information on the plurality of tone mapping curves may be transmitted to a receiving end (e.g., an image processor) through a multi-SEI message in which the first SEI message 910, the second SEI message 920, the third SEI message 930, and the fourth SEI message 940 are combined. Thereafter, in the receiving end, information on each of the tone mapping curves may be stored, and one of the curves may be selected and used to apply tone mapping. Alternatively, information on several tone mapping curves may be used in the receiving end to generate one tone mapping curve, and the generated tone mapping curve may be used to apply tone mapping.

In a system not supporting a multi-SEI message structure, information on the plurality of tone mapping curves may not be transmitted (or processed) using the method of FIG. 9. For example, in the system not supporting the multi-SEI message structure, only information on a tone mapping curve included in a last SEI message (e.g., the fourth SEI message 940) is usually used. Accordingly, in the multi-SEI message structure, information on a tone mapping curve configured by default is preferably included in an SEI message of a last order.

Referring to FIG. 10, information on a plurality of tone mapping curves may be transmitted (or processed) using a single-SEI message 1000. A fact that a size of the SEI message is variable is considered in this method according to the SEI standard (e.g., ST 2094-40) related to DTM. For example, when the single-SEI message 1000 which connects from information 1010 on a second tone mapping curve to information 1030 on an n-th tone mapping curve as one message is transmitted to a receiving end, the receiving end may acquire pieces of information on a plurality of tone mapping curves by parsing information on n tone mapping curves in the single-SEI message 1000. Thereafter, the receiving end may use information on any one tone mapping curve among the acquired pieces of information on the plurality of tone mapping curves, or may use pieces of information on several tone mapping curves to generate one tone mapping curve, and may use the generated tone mapping curve to apply tone mapping.

According to certain embodiments, an electronic device comprises a camera; a memory configured to store a plurality of tone mapping information sets, each of the tone mapping information sets comprising image information of an image frame and tone mapping information of the image frame; and a processor, wherein the processor is configured to: select a tone mapping information set based on user input from among the plurality of tone mapping information sets;

acquire a first image frame captured through the camera; obtain a first feature of the first image frame by analyzing the first image frame; identify a second feature of second image frame corresponding to the selected tone mapping information set, based on image information of the second image frame in the selected tone mapping information set; compare the first feature and the second feature; based on the comparison result, apply tone mapping to the first image frame using tone mapping information of the second image frame in the selected tone mapping information set; and store image data of the first image frame, in the memory.

According to certain embodiments, the processor is configured to apply tone mapping to the first image frame using the tone mapping information of the second image frame, when the comparison result determines that a similarity of the first image frame and the second image frame is greater than or equal to a specified size.

According to certain embodiments, the processor is configured to: generate metadata of the first image frame using information about the first image frame; and store the generated metadata in the memory with the image data of the first image frame, wherein the metadata of the first image frame comprises at least one of minimum and/or maximum brightness of the first image frame, backlight peaking information indicating a brightness mapping parameter of a display backlight unit, a color specification indicating a color gamut and temperature of the first image frame, a transfer parameter indicating a gamma and Contrast Enhancement (CE) control parameter, scene information, histogram information indicating minimum/maximum/optimal pixel value information, and a sharpness parameter indicating intensity information of a boundary region of the first image frame.

According to certain embodiments, the electronic device further comprises a display; and an input device, and the processor is further configured to: display on the display identification information identifying the plurality of tone mapping information sets; receive a user input for selecting any one identification information from among the identification information through the input device; and select a tone mapping information set corresponding to the selected identification information as the tone mapping information set.

According to certain embodiments, the electronic device further comprises a communication circuit, and the processor is configured to: receive a third image frame from an external electronic device through the communication circuit; acquire image information of the third image frame and tone mapping information of the third image frame; and store the acquired image information and tone mapping information in the memory as one of the plurality of tone mapping information sets.

According to certain embodiments, the electronic device further comprises a display; and an input device, and wherein the processor is further configured to: display on the display a third image frame which is pre-stored in the memory; receive a user input through the input device while the third image frame is displayed on the display; identify the third image frame, based on the user input; acquire image information of the third image frame and tone mapping information of the third image frame; and store the acquired image information and tone mapping image in the memory as one of the plurality of tone mapping information sets.

According to certain embodiments, the image information of the image frame comprises at least one of image data of the image frame, sub-sampling data of the image data, Differential Pulse Code Modulation (DPCM) data of the image data, information on a feature point of the image data, and frequency-domain data of the image data.

According to certain embodiments, the tone mapping information of the image frame comprises at least one of tone mapping metadata corresponding to a tone mapping curve applied to the image frame and information on a plurality of knee points of the tone mapping curve.

According to certain embodiments, the plurality of tone mapping information sets are stored by being classified for each category, based on attributes of identification information identifying the plurality of tone mapping information sets.

According to certain embodiments, the electronic device further comprises a display, wherein the processor is configured to: receive a command for reproducing a third image frame pre-stored in the memory; select a tone mapping information set from among the plurality of tone mapping information sets based on user input; obtain a third feature of the third image frame by analyzing the third image frame; identify a fourth feature of fourth image frame corresponding to the selected tone mapping information set, based on image information of the fourth image frame in the selected tone mapping information set; compare the third feature and the fourth feature; based on the comparison result, apply tone mapping to the third image frame, using tone mapping information of the fourth image frame in the selected tone mapping information set; and display on the display the third image frame to which the tone mapping is applied.

According to certain embodiments an image processing method of an electronic device, comprises selecting a tone mapping information set based on user input from among a plurality of tone mapping information sets, each of the tone mapping information sets comprising image information of an image frame and tone mapping information of the image frame stored in a memory of the electronic device; acquiring a first image frame captured through a camera of the electronic device; obtaining a first feature of the first image frame by analyzing the first image frame; identifying a second feature of second image frame corresponding to the selected tone mapping information set, based on image information of the second image frame in the selected tone mapping information set; comparing the first feature and the second feature; based on the comparison result, applying tone mapping to the first image frame using tone mapping information of the second image frame in the selected tone mapping information set; and storing image data of the first image frame in the memory.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a camera;
    a display;
    an input device;
    a memory storing a plurality of tone mapping information sets, each of the plurality of tone mapping information sets comprising image information of an image frame and tone mapping information of the image frame; and
    a processor,
    wherein the processor is configured to:
        display, on the display, an image in the memory,
        receive a first user input through the input device in a state where the image is displayed on the display,
        identify at least one image frame among a plurality of image frames included in the image, based on the first user input,
        acquire image information of the at least one image frame and tone mapping information of the at least one image frame by analyzing the at least one image frame,
        store the acquired image information of the at least one image frame and the acquired tone mapping information of the at least one image frame as another tone mapping information set in the memory,
        select a first tone mapping information set from among the plurality of tone mapping information sets and the another tone mapping information set, based on a second user input received through the input device,
        acquire a first image frame captured through the camera,
        obtain a first feature of the first image frame by analyzing the first image frame,
        identify a second feature of second image frame corresponding to the selected first tone mapping information set, based on image information of the second image frame in the selected first tone mapping information set,
        compare the first feature and the second feature, thereby providing a comparison result,
        based on the comparison result, apply tone mapping to the first image frame using tone mapping information of the second image frame in the selected first tone mapping information set, and
        store image data of the first image frame, in the memory.

2. The electronic device of claim 1, wherein the processor is configured to apply tone mapping to the first image frame using the tone mapping information of the second image frame, when the comparison result determines that a similarity of the first image frame and the second image frame is greater than or equal to a specified size.

3. The electronic device of claim 1, wherein the processor is further configured to:

generate metadata of the first image frame using information about the first image frame, and
store the generated metadata in the memory with image data of the first image frame,
wherein the metadata of the first image frame comprises at least one of minimum and/or maximum brightness of the first image frame, backlight peaking information indicating a brightness mapping parameter of a display backlight unit, a color specification indicating a color gamut and temperature of the first image frame, a transfer parameter indicating a gamma and Contrast Enhancement (CE) control parameter, scene information, histogram information indicating minimum/maximum/optimal pixel value information, and a sharpness parameter indicating intensity information of a boundary region of the first image frame.

4. The electronic device of claim 1,
wherein the processor is further configured to:
display, on the display, identification information identifying the plurality of tone mapping information sets,
receive a third user input for selecting any one identification information from among the identification information through the input device, and
select a tone mapping information set corresponding to the selected any one identification information as the first tone mapping information set.

5. The electronic device of claim 1, further comprising:
a communication circuit, and
wherein the processor is further configured to:
receive a third image frame from an external electronic device connected to the electronic device through the communication circuit,
acquire image information of the third image frame and tone mapping information of the third image frame, and
store the acquired image information of the third image frame and the acquired tone mapping information of the third image frame in the memory as another tone mapping information sets.

6. The electronic device of claim 1, wherein the image information of the image frame comprises at least one of image data of the image frame, sub-sampling data of the image data, Differential Pulse Code Modulation (DPCM) data of the image data, information on a feature point of the image data, and frequency-domain data of the image data.

7. The electronic device of claim 1, wherein the tone mapping information of the image frame comprises at least one of tone mapping metadata corresponding to a tone mapping curve applied to the image frame and information on a plurality of knee points of the tone mapping curve.

8. The electronic device of claim 1, wherein the plurality of tone mapping information sets are stored by being classified for each category, based on attributes of identification information identifying the plurality of tone mapping information sets.

9. The electronic device of claim 1,
wherein the processor is further configured to:
receive a command for reproducing a third image frame pre-stored in the memory,
select a second tone mapping information set from among the plurality of tone mapping information sets and the another tone mapping information set, based on a third user input received through the input device,
obtain a third feature of the third image frame by analyzing the third image frame,
identify a fourth feature of fourth image frame corresponding to the selected second tone mapping information set, based on image information of the fourth image frame in the selected second tone mapping information set,
compare the third feature and the fourth feature, thereby providing a comparison result,
based on the comparison result, apply tone mapping to the third image frame, using tone mapping information of the fourth image frame in the selected second tone mapping information set, and
display, on the display, the third image frame to which the tone mapping is applied.

10. An image processing method of an electronic device, comprising:
storing a plurality of tone mapping information sets, each of the plurality of tone mapping information sets comprising image information of an image frame and tone mapping information of the image frame in a memory of the electronic device;
displaying, on a display of the electronic device, an image in the memory;
receiving a first user input through an input device of the electronic device in a state where the image is displayed on the display;
identifying at least one image frame among a plurality of image frames included in the image, based on the first user input;
acquiring image information of the at least one image frame and tone mapping information of the at least one image frame by analyzing the at least one image frame;
storing the acquired image information of the at least one image frame and the acquired tone mapping information of the at least one image frame as another tone mapping information set in the memory;
selecting a first tone mapping information set from among the plurality of tone mapping information sets and the another tone mapping information set, based on a second user input received through the input device;
acquiring a first image frame captured through a camera of the electronic device;
obtaining a first feature of the first image frame by analyzing the first image frame;
identifying a second feature of second image frame corresponding to the selected first tone mapping information set, based on image information of the second image frame in the selected first tone mapping information set;
comparing the first feature and the second feature, thereby providing a comparison result;
based on the comparison result, applying tone mapping to the first image frame using tone mapping information of the second image frame in the selected first tone mapping information set; and
storing image data of the first image frame in the memory.

11. The image processing method of claim 10, wherein the applying of the tone mapping comprising applying tone mapping to the first image frame using the tone mapping information of the second image frame, when the comparison result determines that a similarity of the first image frame and the second image frame is greater than or equal to a specified size.

12. The image processing method of claim 10, further comprising:
generating metadata of the first image frame using information about the first image frame; and
storing the generated metadata in the memory with the image data of the first image frame, wherein the metadata of the first image frame comprises at least one of minimum and/or maximum brightness of the first image frame, backlight peaking information indicating a brightness mapping parameter of a display backlight unit, a color specification indicating a color gamut and temperature of the first image frame, a transfer parameter indicating a gamma and Contrast Enhancement (CE) control parameter, scene information, histogram information indicating minimum/maximum/optimal pixel value information, and a sharpness parameter indicating intensity information of a boundary region of the first image frame.

13. The image processing method of claim 10, wherein the selecting of the first tone mapping information set comprises:
   displaying, on the display, identification information identifying the plurality of tone mapping information sets;
   receiving a third user input for selecting any one identification information from among the identification information through the input device; and
   selecting a tone mapping information set corresponding to the selected identification information as the first tone mapping information set.

14. The image processing method of claim 10, further comprising:
   receiving a third image frame from an external electronic device connected to the electronic device through a communication circuit of the electronic device;
   acquiring image information of the third image frame and tone mapping information of the third image frame; and
   storing the acquired image information of the third image frame and tone mapping information of the third image frame in the memory as another mapping information sets.

15. The image processing method of claim 10, wherein the image information of the image frame comprises at least one of image data of the image frame, sub-sampling data of the image data, Differential Pulse Code Modulation (DPCM) data of the image data, information on a feature point of the image data, and frequency-domain data of the image data.

16. The image processing method of claim 10, wherein the tone mapping information of the image frame comprises at least one of tone mapping metadata corresponding to a tone mapping curve applied to the image frame and information on a plurality of knee points of the tone mapping curve.

17. The image processing method of claim 10, wherein the plurality of tone mapping information sets are stored by being classified for each category, based on attributes of identification information identifying the plurality of tone mapping information sets.

18. The image processing method of claim 10, further comprising:
   receiving a command for reproducing a third image frame pre-stored in the memory;
   selecting a second tone mapping information set from among the plurality of tone mapping information sets and the another tone mapping information set, based on a third user input received through the input device;
   obtaining a third feature of the third image frame by analyzing the third image frame;
   identifying a fourth feature of fourth image frame corresponding to the selected second tone mapping information set, based on image information of the fourth image frame in the selected second tone mapping information set;
   comparing the third feature and the fourth feature, thereby providing a comparison result;
   based on the comparison result, applying tone mapping to the third image frame, using tone mapping information of the fourth image frame in the selected second tone mapping information set; and
   displaying, on the display, the third image frame to which the tone mapping is applied.

* * * * *